Feb. 18, 1964    N. ECONOMOU ETAL    3,121,392
THRUST PROPELLED VEHICLE
Filed Jan. 24, 1961    2 Sheets-Sheet 2

INVENTOR.
NICHOLAS ECONOMOU
JACK M. HART
BY
Beau, Brooks, Buckley & Beau
ATTORNEYS

United States Patent Office 3,121,392
Patented Feb. 18, 1964

3,121,392
THRUST PROPELLED VEHICLE
Nicholas Economou, Buffalo, and Jack M. Hart, Lockport, N.Y., assignors to Bell Aerospace Corporation, Wheatfield, N.Y.
Filed Jan. 24, 1961, Ser. No. 84,612
6 Claims. (Cl. 102—49)

This invention relates to missile-type vehicles, and more particularly to a new and improved structural design for efficient integration of the essential propellant containing an engine and payload support and thrust transmitting components thereof.

Specifically, this invention may be advantageously applied for example to construction of the final or "space stage" component of a multi-stage rocket such as may be designed to project a payload into an orbit in space. In such case, the basic problem is to design a package including provision for payload and guidance equipment, propellant tanks, and engine, arranged in an efficient and compact configuration of the least possible weight and bulk, and having the highest possible strength-to-weight ratio.

Accordingly, the primary object of the present invention is to provide an improved structural arrangement combining fuel and oxidizer tanks; propelling engine; and payload support and guidance system housing means; to provide a vehicle which packages the maximum amount of energy in the form of stored propellants, in more efficient manner within a structure having a higher strength-to-weight ratio than heretofore attained.

Another object of the invention is to provide an improved structure as aforesaid which includes separate fuel and cryogenic oxidizer storage compartments, as are required when using modern propellants comprising highly volatile fuels and oxidizers.

Still another object of the invention is to utilize internal pressurization of a portion of the structure of the invention to impart requisite rigidity to the structure, obviating necessity for structural framing members which would otherwise be required to stiffen and strengthen the device; thus reducing the weight of the structure, simplifying construction thereof, and reducing the number of stress concentration points such as are inducive to leakage problems.

Figure 1:
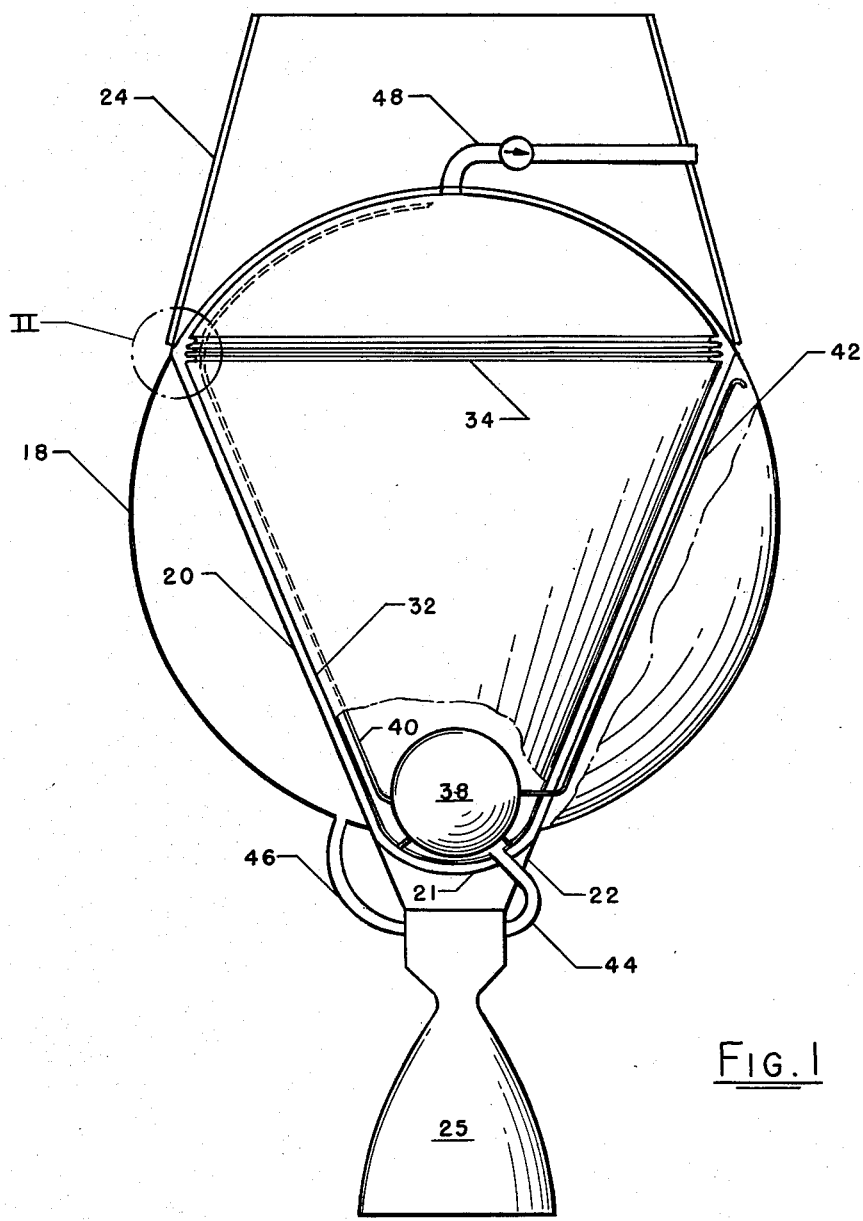
Figure 2:
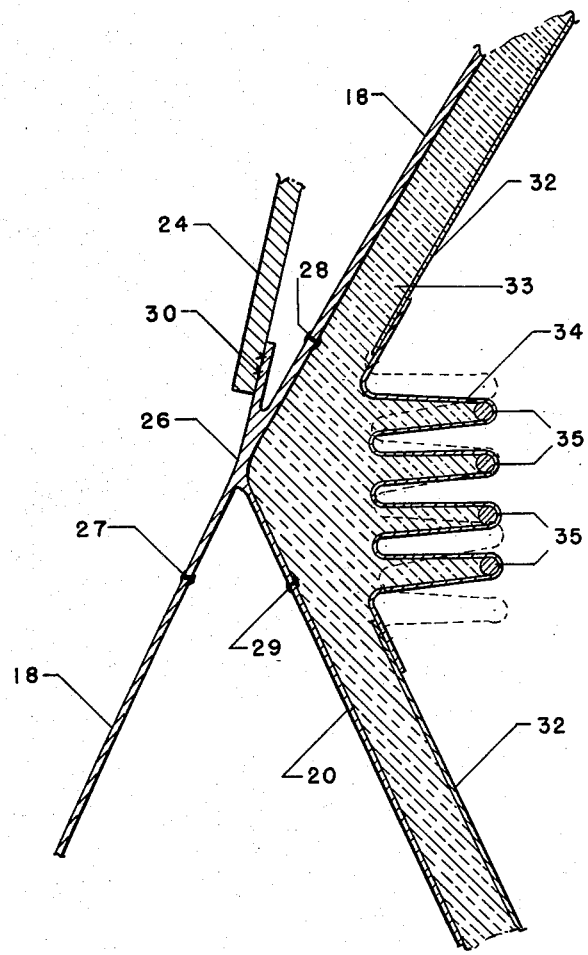

A number of other objects and advantages of the invention will appear from the detailed description hereinbelow and the accompanying drawings wherein:

FIG. 1 is an elevational view of an aerospace vehicle of the invention with portions thereof broken away to illustrate their interiors; and FIG. 2 is a sectional view on greatly enlarged scale taken in the area indicated at II of FIG. 1 showing details of construction.

The vehicle construction of the invention as shown in FIG. 1 may be utilized, for example, as the final stage of a missile, and includes an integral dual-tank propellant section comprising an outer spherically shaped shell 18, an inner, conically shaped shell portion 20, and an engine mount ring 22 extending beyond the spherical shell while functioning as an extension of one end of the conical shell 20. A payload support and instrument housing section as shown schematically at 24, extends forwardly from the juncture of the other end of the inner shell 20 with the outer shell 18.

The spherical shell 18 may be a simple skin structure, formed from suitable material such as #6061 aluminum alloy, while the conical inner shell may be also of simple skin or sheet metal form. The lower end of the cone is closed by a curved end wall portion 21 to which is attached the mounting ring 22 which carries a thrust engine 25. The upper end of the shell 20 is welded perimetrally to the spherical shell 18; and as shown in FIG. 2 the fabrication may be facilitated by employing an X sectioned girth ring 26 to which the spherical shell parts are welded as indicated at 27, 28; and to which the conical shell 20 and payload support 24 are welded as indicated at 29 and 30 respectively. The payload support section 24 may be constructed for example of corrugated aluminum skin of suitable thickness and suitably stiffened if required.

To adapt the device to accommodate cryogenic fluids under varying pressures and in close association with other higher temperature propellant fluids, the conical shell 20 is insulated by means of a lining 32 formed of metal foil or the like, such as a 2/100 inch thick "2S" aluminum alloy spaced away from the inner surface of the shell 20 by means of a fibrous or granular insulation material 33; the space between the shell 20 and the liner 32 being evacuated to enhance the insulation effect. To avoid rupturing of the liner 32 incidental to pressure changes interiorly of the shell 20, the liner is constructed to include a bellows portion 34 running girthwise of the liner. Preferably, the bellows device is stabilized by wire hoops as indicated at 35; and thus as pressures vary at opposite sides of the liner, the liner material positionally adjusts to avoid stress concentrations therein, while being at all times supported by the insulation material 33 and by the shell 20.

A pressure supply source, such as a tank 38 (FIG. 1) containing gaseous helium is conveniently mounted in the small end of the shell 20 and is arranged to deliver through conduits 40, 42 to the interiors of the shells 20 and 18 respectively. Thus the propellants within the shells 18, 20 are maintained under constant pressure so as to be readily displaced and fed to the engine 25 through inlets 44, 46 under control of suitable valves (not shown). At the same time, the pressurization of the shells 18, 20 operates to rigidify the structure comprising the shell 20, insulation 33, and liner 32, so that it possesses increased thrust strength characteristics. A pressure relief system as indicated at 48 may be included to avoid build-up of excessive internal pressures.

Hence, the structure may be fabricated of minimum weight materials, and of sufficient strength only when unloaded to be self-sustaining. However, when the insulation area is air-evacuated and the propellants are loaded and then pressurized, the conical shell structure is thereby reinforced and stiffened and rendered capable of transmitting heavy thrust loads between the engine mount and the payload mount such as are incidental to accelerations encountered in missile operations.

The structural arrangement of the invention provides important specific advantages such as follows. The spherical shape of the shell 18 obviously requires the least external wall area of structure necessary to accommodate the required gallonage of propellant. The combination of the conically shaped inner shell 20 (with the engine mount 22 formed as an extension of the walls thereof) provides a highly efficient structure to take the thrust loads from the engine to the payload. Also, this tank configuration provides the shortest possible connections between the engine and the oxidizer and fuel tanks. Furthermore, in this arrangement the inner tank acts as a slosh baffle for the contents of the outer tank; and finally, the overall configuration provides a very high strength-to-weight ratio. For example, it has been determined that a structure of the present invention, including engine and guidance and control equipment, will carry a fuel and payload weighing up to twenty-five times its own weight, while successfully withstanding the thrust forces necessary to put the vehicle into orbit.

In lieu of the specific cone shaped construction illustrated and described hereinabove, the combination inner

We claim:

1. A thrust propelled vehicle including a spherically-shaped shell substantially enveloping a cone-shaped partition member, said shell and said partition member being fixedly connected at opposite ends of said partition member to provide separate fluid-sealed compartments interiorly and exteriorly of said partition member, a thrust engine mounted upon said structure in the region of interconnection between the apex portion of said partition member and said shell to drive the vehicle forwardly, a payload support mounted upon the opposite end of said structure, and a fluid pressure supply tank carried at the apex end portion of said partition member and having outlets discharging into said separate compartments.

2. A thrust propelled vehicle including a structure functioning both as a propellant container and as a thrust transmitter, said structure comprising a conically shaped tank closed at its apex end by means of a wall portion providing an engine support mount, a thrust engine fixed to said support mount, a substantially spherically shaped shell substantially enveloping said tank and fixed thereto in fluid sealed relation to the opposite ends of said tank whereby a wall portion of said shell completes closure of said tank for fuel containing purposes and whereby said shell and said tank cooperate to provide a second separate fluid container substantially enveloping said tank, a deformable fluid sealing lining disposed interiorly of said tank and positionally supported thereby while in floating relation thereon, a pressure supply means mounted upon said vehicle and having pressure delivery outlets into the aforesaid separate fluid chambers, whereby pressurization of said chambers compacts said lining against said tank structure and substantially rigidifies the latter and increases its thrust load transmission capabilities.

3. A thrust propelled vehicle including a thrust carrying shell structure of cone shape, a thrust engine mounted at the apex end of said structure to drive the latter forwardly, a payload container mounted upon the front end of said structure to be driven thereby, a spherical shell substantially enveloping said cone shaped shell structure and joined thereto both at the apex and large ends thereof and closing the large end thereof, the rear end portion of said structure being closed and thereby providing a container for a fluid propellant material, said spherically-shaped shell substantially enveloping said structure whereby the portion of said spherical shell surrounding said cone structure provides a second container adapted to separately contain a second fluid propellant material.

4. A thrust propelled vehicle including a thrust carrying structure of minimum weight and comprising a cone-shaped inner tank mounting at one end an engine support at its other end a payload support, a thrust engine mounted upon said engine support to drive the vehicle forwardly, a fluid-sealed spherically-shaped propellant tank enveloping said inner tank structure and joined thereto at the opposite ends of said inner tank whereby the portion of said spherical tank surrounding said inner tank is adapted to separately contain a second fluid propellant material, compressible insulation means coating the walls of said inner tank, a flexible liner disposed against said insulation means, and fluid pressure supply means carried by said vehicle arranged to pressure both containers and thereby compact said insulation and said liner against the wall members of said inner tank and to thereby develop a composite structure of increased rigidity and increased thrust transmission capabilities.

5. A thrust propelled vehicle comprising a frame member of frustro-conical configuration oriented with the axis of the frame member longitudinally disposed relative to the vehicle and with the base of such frame member at the forward end of the vehicle, a propulsion motor mounted at the smaller, rearward end of said frame member, a spherically-shaped shell substantially enveloping said frame member and joined thereto both at the base and at said rearward end thereof whereby said frame member and said shell provide an integrated frame assembly and a propellant space therebetween, said main frame member being closed at said rearward end thereof whereby said main frame member and that portion of said shell closing the base thereof provide a second propellant space.

6. A thrust propelled vehicle comprising a combined frame and liquid propellant-receiving assembly, said assembly including a frustro-conical member and a spherical shell substantially enclosing such member, said member intersecting said shell at the base of said member and being joined thereto along such base, the smaller end of said member opposite its base being closed and likewise joined to said shell, whereby to provide a pair of propellant spaces, one exteriorly of and the other interiorly of said frustro-conical member, a thrust motor mounted at the smaller end of said member, and a payload support device, said support device being fixed to said frame assembly substantially at the juncture between said base of the frustro-conical member and said shell.

References Cited in the file of this patent

UNITED STATES PATENTS

| | | |
|---|---|---|
| 2,085,800 | Goddard | July 6, 1937 |
| 2,722,336 | Wexler et al. | Nov. 1, 1955 |
| 2,835,548 | Baumann | May 20, 1958 |
| 2,850,975 | Teague | Sept. 9, 1958 |
| 2,874,539 | Fox | Feb. 24, 1959 |
| 2,889,953 | Morrison | June 9, 1959 |
| 2,911,125 | Dosker | Nov. 3, 1959 |
| 2,943,828 | Van Driest | July 5, 1960 |
| 3,010,279 | Mullen et al. | Nov. 28, 1961 |